(12) United States Patent
Stielper (10) Patent No.: US 6,308,424 B1
(45) Date of Patent: Oct. 30, 2001

(54) CIRCULAR SAW

(75) Inventor: Henry J. Stielper, Phoenix, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/352,016

(22) Filed: Jul. 12, 1999

Related U.S. Application Data

(60) Provisional application No. 60/093,305, filed on Jul. 21, 1998.

(51) Int. Cl.$^7$ ................................................. B23D 45/16
(52) U.S. Cl. ................................................................. 30/391
(58) Field of Search ............................ 30/388, 390, 391, 30/124; 83/168

(56) References Cited

U.S. PATENT DOCUMENTS

| | | |
|---|---|---|
| 1,830,579 | 11/1931 | Wappat . |
| 2,795,248 | 6/1957 | Doerner . |
| 4,450,627 | 5/1984 | Morimoto . |
| 4,555,849 | 12/1985 | Ando et al. . |
| 4,675,999 | 6/1987 | Ito et al. . |
| 4,856,394 | 8/1989 | Clowers . |
| 5,023,999 | * 6/1991 | Looper et al. ........................ 30/390 |
| 5,327,649 | * 7/1994 | Skinner .............................. 30/390 X |
| 5,675,895 | * 10/1997 | Mori et al. .......................... 30/390 X |

FOREIGN PATENT DOCUMENTS 1040771   10/1958   (DE) .

* cited by examiner

*Primary Examiner*—Douglas D. Watts
(74) *Attorney, Agent, or Firm*—Charles E. Yocum (57) ABSTRACT

A circular saw 30 includes a housing 32, a fixed upper guard 34, a movable lower guard 36 and a shoe 38. A saw motor 48 is selectively operated to rotate a circular saw blade 54 to facilitate the formation of a selective cut or kerf into a workpiece 57 under the control of an operator. A forward end 126, and a wing wall 138, of the upper guard 34 form an enclosed chamber 122 which is placed in close proximity with an adjacent surface 46 of the shoe 38 to essentially preclude chips from discharging through a slight space 39 therebetween. A trailing peripheral portion 148 of the upper guard 34 is formed with an inner radial path for receiving the lower guard 36 within the upper guard, and an outer radial path for management and directing of chips to a rear end 130 of the upper guard for discharging of the chips. A pair of stripes 102 and 104, and a sight window 90, are located on a forward portion of the surface 46 of the shoe 38 to assist an operator of the saw 30 in the accurate formation of the kerf.

21 Claims, 10 Drawing Sheets

CIRCULAR SAW

This application claims benefit of provisional application Ser. No. 60/093,505 filed Jul. 21, 1998.

BACKGROUND OF THE INVENTION

This invention relates to a circular saw, and particularly relates to a circular saw which includes facility for alignment of a saw blade thereof during the cutting of a workpiece, and for managing the disbursement of chips of the workpiece resulting from the cutting of the workpiece upon use of the saw.

A circular saw includes a generally circular saw blade having cutting teeth or tips located radially about the periphery of the blade. The blade is mounted on a housing of the saw and is rotatably driven during the cutting of a workpiece, under the control of a user or operator of the circular saw. The circular saw also typically includes an upper guard which is fixedly located about an upper portion of the blade to preclude contact with the upper portion of the blade by anyone who is handling or using the saw to form kerfs in the workpiece. In some instances, a lower guard is located about a lower portion of the blade and precludes contact, by a handler or operator, with the blade when the blade is at rest or is being rotated but not placed in a position to form a kerf in the workpiece. The lower guard is mounted to the housing for rotary, or swinging, movement when the saw is manipulated to move the rotating blade into cutting engagement with the workpiece.

In some instances, a flat plate is attached to the housing of the circular saw and is formed with an opening therethrough. The blade is mounted to then housing in such a manner that a first portion of the blade extends outward from the opening and a first major side of the plate, and a second portion of the blade extends from the opening and a second major side of the plate. The flat plate provides a guiding surface which the operator of the saw can position on the workpiece to facilitate control of the circular saw during a cutting operation.

When the circular saw is used to form a kerf in the workpiece, the portions of the workpiece, which are being removed by the rotating blade, separate from the workpiece in the form of chips. The resulting chips are dispersed from the blade-cutting area, and scatter in random directions.

When the workpiece is composed of wood, the chips are heated to some extent as a natural result of the chips being separated from the workpiece by the blade. However, as the chips are being dispersed from the cutting area, the heat thereof is quickly dissipated, and any dispersed chips which may eventually strike an exposed skin area of the operator, or others nearby, are usually cooled sufficiently to be harmless, provided the operator and others nearby are wearing safety glasses. If the workpiece is composed of metal, the dispersed metal chips tend to retain the heat developed during the formation of the kerf. As the heated metal chips are randomly dispersed, many of the chips will strike the operator and could injure exposed skin areas of the operator.

Thus, there is a need for a circular saw which will effectively manage the dispersement of chips, particularly when the saw is used to cut metal, to insure that the chips are discharged in a direction which avoids contact with the operator.

Prior to using a saw to form a kerf in the workpiece, the operator may place guide lines on a surface of the workpiece which define the location of the kerf to be formed. The operator then moves the blade along the guide lines when using the circular saw to form the kerf. In a circular saw which includes the flat plate, the plate may cover all or a portion of the guide lines and thereby obstruct the view of the operator. Circular saws have been designed with a notch or second opening formed in the flat plate, forward of the blade, to provide some opportunity for the operator to see the guide lines during the cutting operation. For example, U.S. Pat. No. 4,856,394, which issued on Aug. 15, 1989, shows a circular saw having a notch formed in a forward edge of a shoe thereof, while U.S. Pat. No. 4,555,849, which issued on Dec. 3, 1985, shows a circular saw formed with a perforation through a forward portion of a flat plate.

While the notch or perforation noted above provide some opportunity for the operator to see guide marks on the workpiece during a kerf-forming operation, a major portion of the guide marks remain obstructed during the operation.

Thus, there is a need for a circular saw with a facility for providing effective kerf-forming guidance for an operator of the saw which includes a shoe with portions extending forward of the blade thereof.

SUMMARY OF THE INVENTION

It is, therefore, an object of this invention to provide a circular saw which will effectively manage the dispersement of chips, to insure that the chips are discharged from the circular in a direction which avoids contact with the operator of the saw.

Another object of this invention is to provide a circular saw with a facility for providing effective kerf-forming guidance for the operator of the saw, which includes a shoe with portions extending forward of the blade thereof.

With these and other objects in mind, this invention contemplates a circular saw which includes a housing, a mount for receiving and supporting a saw blade in a given plane, and a motor located within the housing and coupled to the mount for driving the mount and, thereby, the saw blade to be mounted thereon. A shoe is attached to the housing and is formed with an opening therethrough which is located in the given plane. The opening is formed with a first section of a first prescribed width about the given plane and with a second section of a second prescribed width about the given plane, where the second prescribed width is greater than the first prescribed width.

This invention further contemplates a circular saw which includes a housing, a mount for receiving and supporting a saw blade in a given plane, and a motor located within the housing and coupled to the mount for driving the mount and, thereby, the saw blade to be mounted thereon. A shoe is attached to the housing and a stripe is located on one side of the shoe which is visible to an operator when using the saw, and is aligned with a forwardmost cutting location of the blade The stripe extends at an angle with respect to the given plane of the blade.

Additionally, this invention contemplates a circular saw which includes a housing, a mount for receiving and supporting a saw blade in a given plane, and a motor located within the housing and coupled to the mount for driving the mount and, thereby, the saw blade to be mounted thereon. A shoe is attached to the housing. A guard is attached to the housing and extends outward from the one side of the shoe. The guard forms a substantially enclosed chamber about an area in which cutting portions of the blade are to be moved during cutting of a workpiece. The guard is formed with a first end edge at one end thereof in a forward area of the saw where the blade is to cut into the workpiece, and a second end edge at a second end of the guard spaced from the first end edge in a rear area of the saw. The first end edge of the guard is located in juxtaposition with the one side of the shoe and sufficiently close to the shoe to essentially preclude the discharge of chips through any space between the first end edge and the shoe in the forward area. The second end edge of the guard is adjacent the one side of the shoe to define an opening therebetween which is of sufficient size to allow chips to be discharged therethrough but to control the direction of movement of the discharged chips away from the saw.

Further, this invention contemplates a circular saw wherein the guard is formed with an inner edge portion, which is contiguous with the first end edge of the guard, in a direction away from the shoe. A wing wall is formed on the guard and extends from the inner edge portion of the guard toward the given plane.

Also, this invention contemplates a circular saw which includes a first guard which forms a substantially enclosed chamber radially outboard of an area in which cutting portions of a circular blade of the saw are to be located and moved during cutting of a workpiece. A second blade guard is mounted for movement into a first path within the enclosed chamber, where the first path is radially outboard of the area in which the cutting portions of the blade are to be located. The enclosed chamber is formed with a second path which is radially outboard of the first path thereof to facilitate the managed disbursement of chips therethrough.

Other objects, features and advantages of the present invention will become more fully apparent from the following detailed description of the preferred embodiment, the appended claims and the accompanying drawings.

DESCRIPTION OF THE PREFERRED EMBODIMENT

Figure 1:
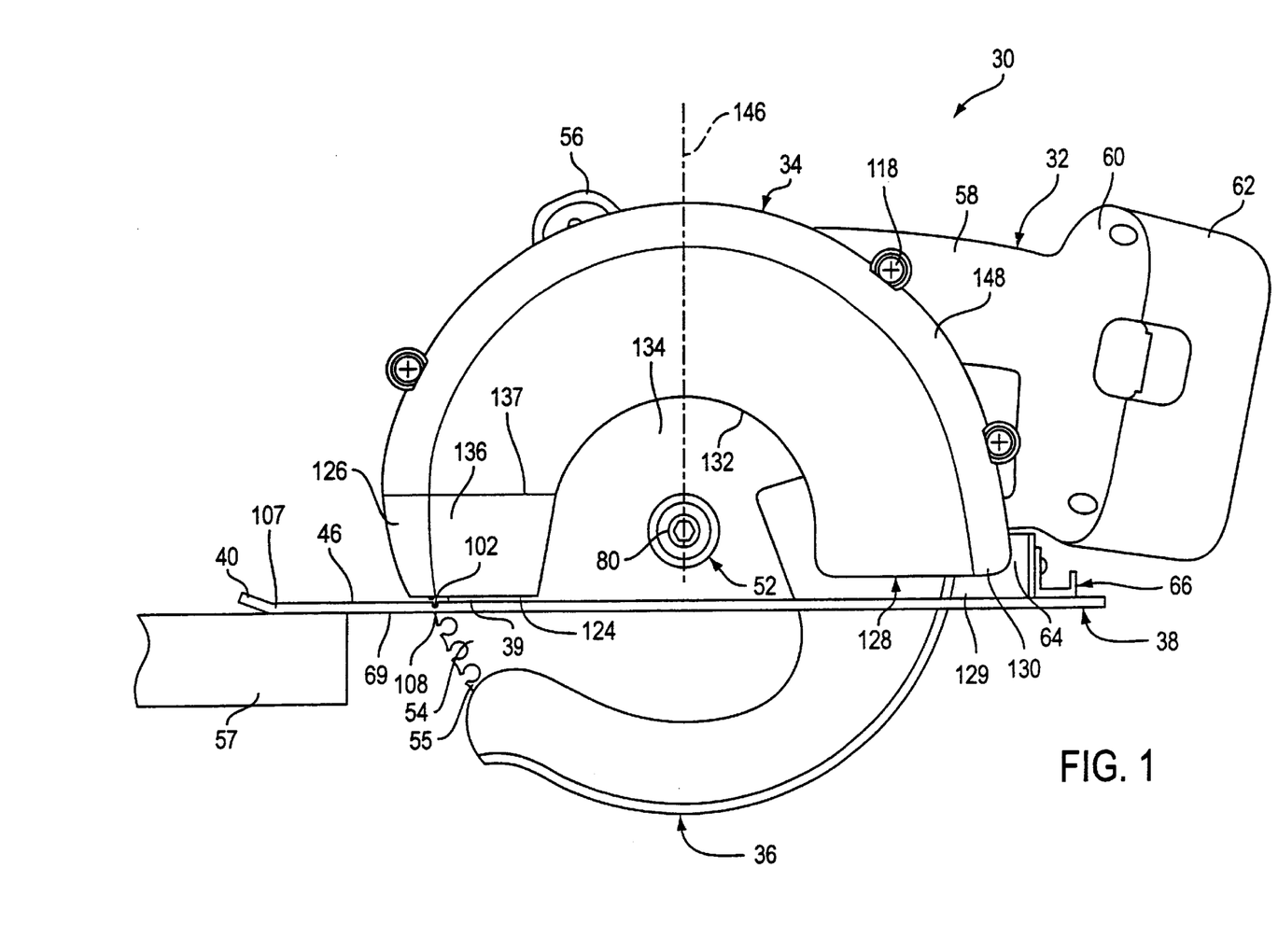
FIG. 1 is a side view showing a circular saw embodying certain principles of the invention.
Figure 2:
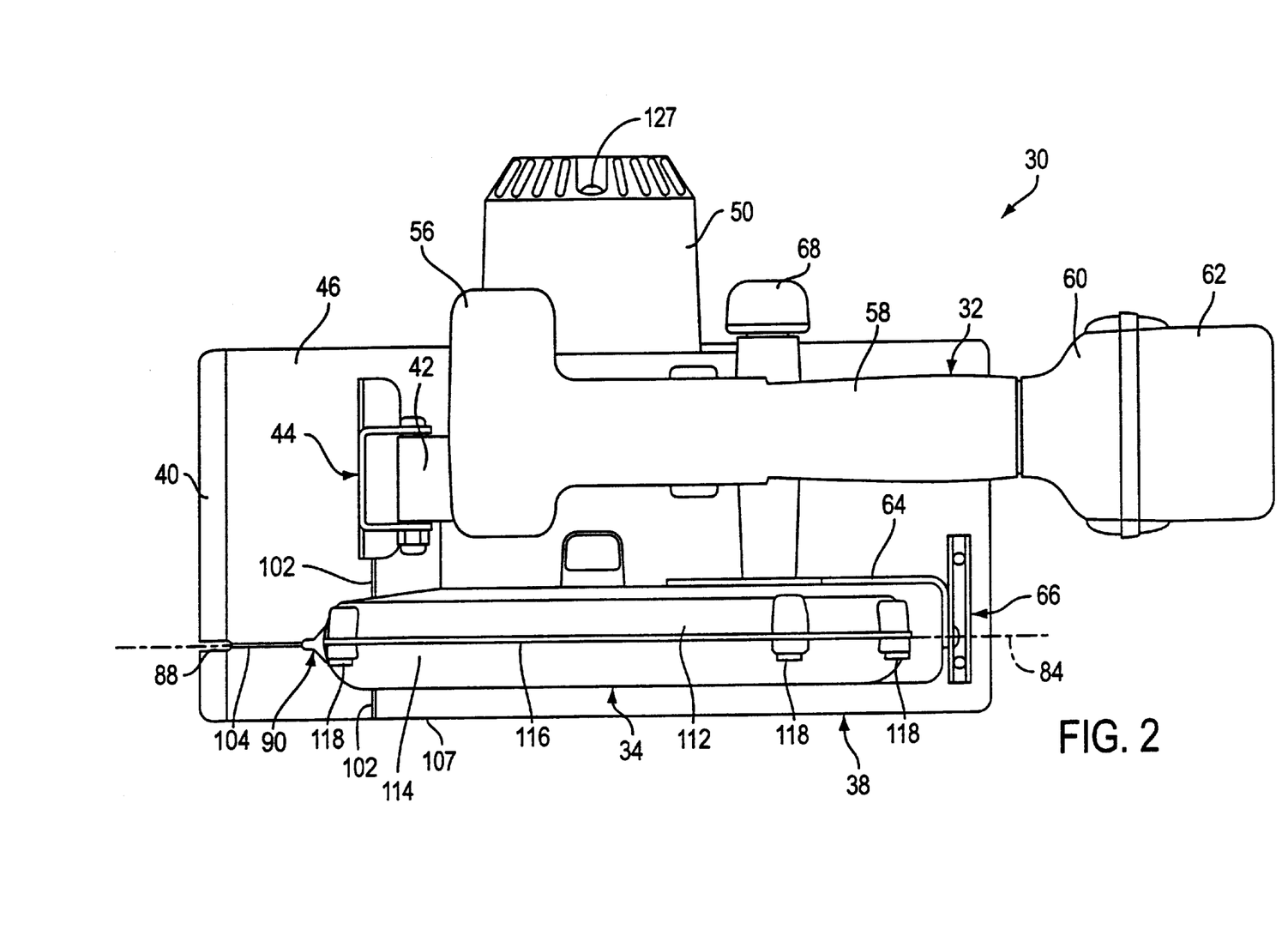
FIG. 2 is a top view showing the circular saw of FIG. 1 embodying certain principles of the invention.
Figure 3:
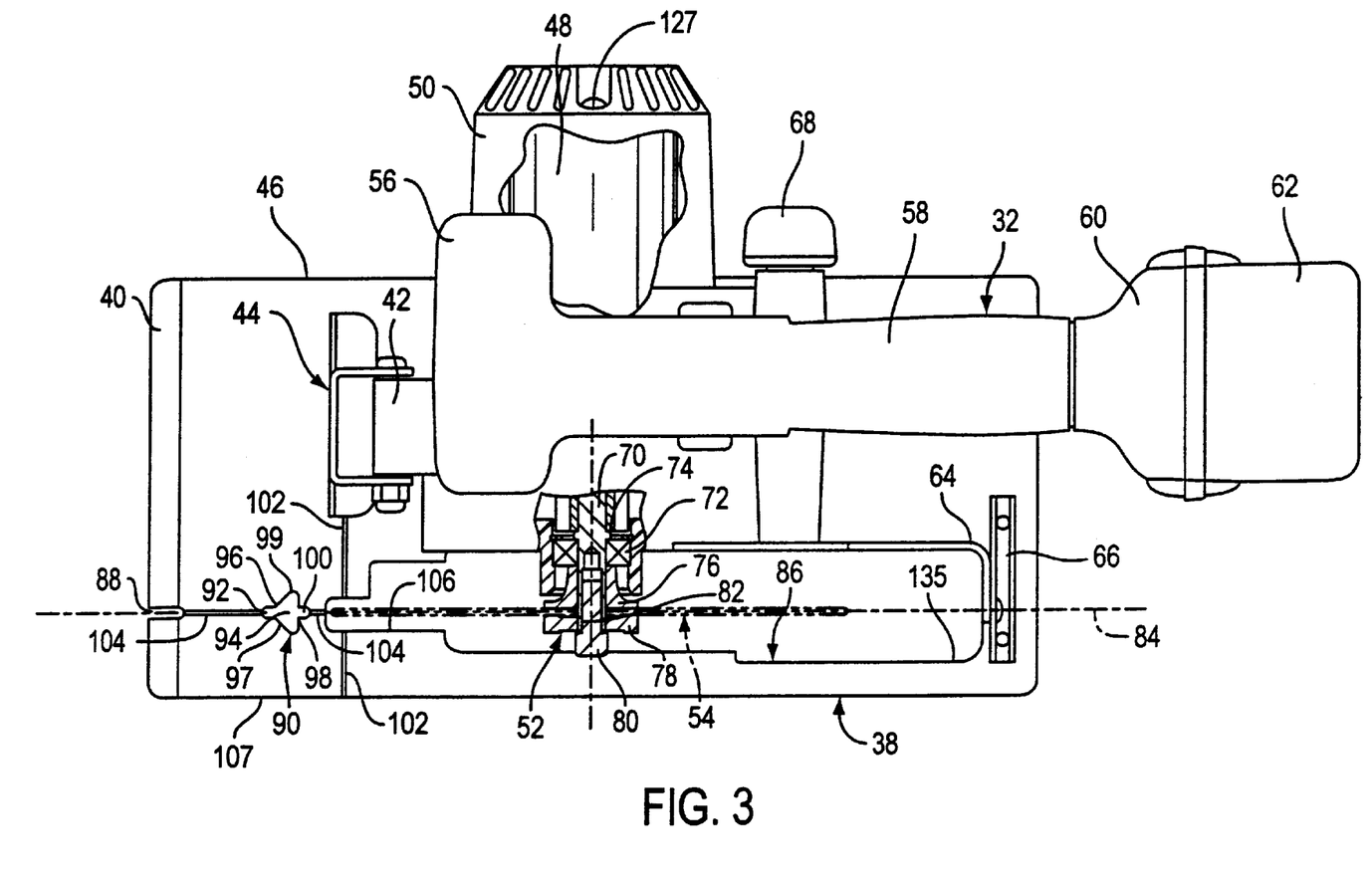
FIG. 3 is a top view showing the circular saw of FIGS. 1 and 2 with parts removed to reveal selected elements of the saw embodying certain principles of the invention.

Referring to FIGS. 1 and 2, a circular saw 30 includes a housing 32, a fixed upper guard 34, a movable lower guard 36 and a shoe 38. The shoe 38 is substantially flat with a slightly upturned forward end 40. A forward portion 42 of the housing 32 is attached for pivotal movement to a bracket 44 which is secured fixedly to one side, or an upper surface 46, of the shoe 38. As shown in FIG. 3, a motor 48 is contained within an extended enclosure 50 of the housing 32 and is coupled through a gear reduction unit (not shown) to a mount 52 for a saw blade 54 having cutting teeth 55 about the periphery thereof. Upon operation of the motor 48 by an operator, the mount 52 is rotated to thereby rotate the blade 54 and the cutting teeth 55 to facilitate the formation of a selective cut or kerf into a workpiece 57 under the control of the operator.

As illustrated in FIGS. 2 and 3, the housing 32 includes a forward hand-grip section 56, an intermediate handle section 58 and a rear section 60. In the preferred embodiment, a battery housing 62 contains batteries (not shown) which supply electrical energy for operating the motor 48. When the battery housing 62 is assembled with the rear section 60 of the housing 32, as shown in FIGS. 1, 2 and 3, the batteries are electrically connected into an electrical circuit (not shown) for supplying electrical energy to the motor 48 through selective operation of a trigger switch (not shown) by the operator of the circular saw 30.

The circular saw 30 also could be powered in a corded electrical system, or by other systems such as, for example, pressurized air or fluid, without departing from the spirit and scope of the invention.

As shown in FIGS. 2 and 3, an arcuate arm 64 is secured to a bracket 66, which is secured to a rear portion of the upper surface 46 of the shoe 38. The arm 64 is formed with a closed slot (not shown) which receives a fastening element (not shown). The fastening element can be selectively rotated by rotation of a control knob 68 attached thereto. When the control knob 68 is rotated to loosen the fastening element, the housing 32, with the guards 34 and 36 and the saw blade 54, can be pivoted about the forward portion 42 of the housing to a selected location within the limits established by the length of the closed slot formed in the arm 64. Thereafter, the knob 68 is rotated to tighten the fastening element to secure the housing 32, the guards 34 and 36 and the saw blade 54 in the selected location. By use of this facility, the operator of the saw 30 can select the distance at which the blade 54 extends from a lower surface 69 of the shoe 38, and thereby the depth of cut into the workpiece 57 as measured from the lower surface of the shoe.

As shown in FIG. 3, the mount 52 includes a spindle 70 and a bearing 72 located on the spindle against a flange 74 extending radially outward from the spindle. The mount 52 further includes an inner clamp washer 76 located on the spindle 70 adjacent the outboard side of the bearing 72. The saw blade 54 is then positioned on the spindle 70 adjacent the inner washer 76. The mount 52 also includes an outer clamp washer 78 which is positioned on the spindle 70 and against the adjacent portion of the saw blade 54, and also includes a bolt 80 which is threadedly assembled within a threaded axial bore 82 formed in a free end of the spindle. In this manner, the mount 52 receives and supports the saw blade 54 in a given plane 84, which is represented in FIGS. 2 and 3 by a centerline.

Referring to FIG. 3, the shoe 38 is formed with an opening 86 therethrough which facilitates the positioning of the saw blade 54 with respect to the shoe. In this position, portions of the blade 54 are located above the upper surface 46 of the shoe 38 and portions of the blade are located below the lower surface 69 of the shoe as shown in FIG. 1. The forward end 40 of the shoe 38 is formed with a "visualization" slot 88 which is located centrally about the plane 84 of the blade 54. A "sight" window 90 is formed through the shoe 38 along the plane 84 between the slot 88 and the opening 86. The window 90 is formed with a first section 92 of a first prescribed width about the plane 84 and a second section 94 of a second prescribed width about the plane. The second prescribed width is greater than the first prescribed width.

In the preferred embodiment, the second section 94 of the window 90 is formed with a first end 96 and a second end 98 spaced from the first end, with opposite sides 97 and 99 extending therebetween, and with a side-to-side width which is greater from the first end to the second end than any side-to-side width of the first section 92. Also, in the preferred embodiment, the width of the second section 94 of the window 90 varies linearly, by diverging uniformly from the first end 96 to the second end 98 thereof, as illustrated in FIG. 3. Further, in the preferred embodiment, the first section 92 and the second section 94 are in communication with each other.

Without departing from the spirit and scope of the invention, the sides 97 and 99 of the second section 94 of the window 90 could be formed in any configuration which includes portions spaced apart by a distance greater than the distance of any spaced portions of the sides of the first section 92. For example, the configuration of either or both sides 97 and 99 of the second section 94 could be formed with, but not limited to, a curved portion, or a saw-tooth-like portion, or a stepped portion, or the second section could be formed in a square or rectangular configuration from the first end 96 to the second end 98.

As further shown in FIG. 3, the window 90 is formed with a third section 100 which is spaced from the first section 92 and, in the preferred embodiment, is formed with a uniform width about the plane 84. While the uniform width of the third section 100 of the window 90 is the same as the prescribed width of the first section 92, the uniform width of the third section could be greater or less than the prescribed width without departing from the spirit and scope of the invention. Also, in the preferred embodiment, the second section 94 is between the first section 92 and the third section 100, with the three sections being in communication with each other.

Without departing from the spirit and scope of the invention, the second section 94 and either the first section 92 or the third section 100, or both, could form openings in the shoe 38 but not be in communication with each other, As further shown in FIG. 3, a "depth-of-cut" stripe 102 is formed on or in the upper surface 46 of the shoe 38 on opposite sides of a forward portion 106 of the opening 86, and extends angularly from the plane 84. In the preferred embodiment, the stripe 102 is perpendicular to the plane 84 and extends to an outer edge 107 of the shoe 38. As shown in FIG. 1, a portion of the stripe 102 is immediately adjacent, and is aligned with, a forwardmost location 108 at which the rotating blade 54 is situated to cut into the workpiece 57. The preferred embodiment of the stripe 102 is perpendicular to the plane 84, but could be at angles other than ninety degrees without departing from the spirit and scope of the invention.

As shown in FIGS. 2 and 3, a "cut-line" stripe 104 is formed on or in the upper surface 46 of the shoe 38 within, and along, the plane 84 between the slot 88 and the window 90. A slight continuation of the stripe 102 is formed on or in the upper surface 46 of the shoe 38 between the window 90 and the opening 86.

In the preferred embodiment of the invention, the stripes 102 and 104 are established by grooves, as illustrated in FIG. 3, formed in the upper surface 46 of the shoe 38. However, the stripes 102 and 104 could be formed in other ways without departing from the spirit and scope of the invention. For example, the stripes 102 and 104 could be formed by a ridge, or by an applied marking substance having a color which contrasts with the color of the upper surface 46 of the shoe 38. Also, the grooves, or ridges, of the stripes 102 and 104 could have a marking substance applied thereto to further enhance the visualization of the stripes.

As shown in FIG. 2, the upper guard 34 is formed by an inner section 112, adjacent the housing 32, and an outer section 114 which, when assembled along a seam 116, are held together by a plurality of threaded fasteners 118. While the preferred embodiment of the upper guard 34 is formed by joining the two sections 112 and 114 along the seam line 116, the upper guard 34 could be made initially as a single element, or by joining more than two sections, without departing from the spirit and scope of the invention.

Figure 4:
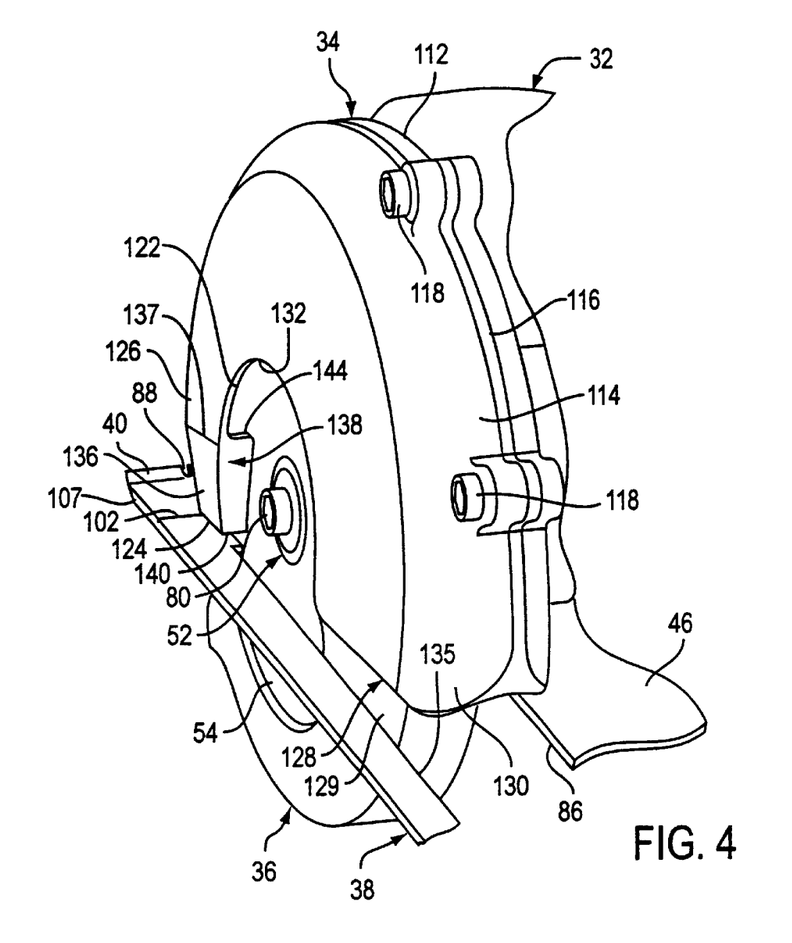
FIG. 4 is a perspective view of a portion of the circular saw of FIG. 1 showing selected elements of the saw embodying certain principles of the invention.
Figure 5:
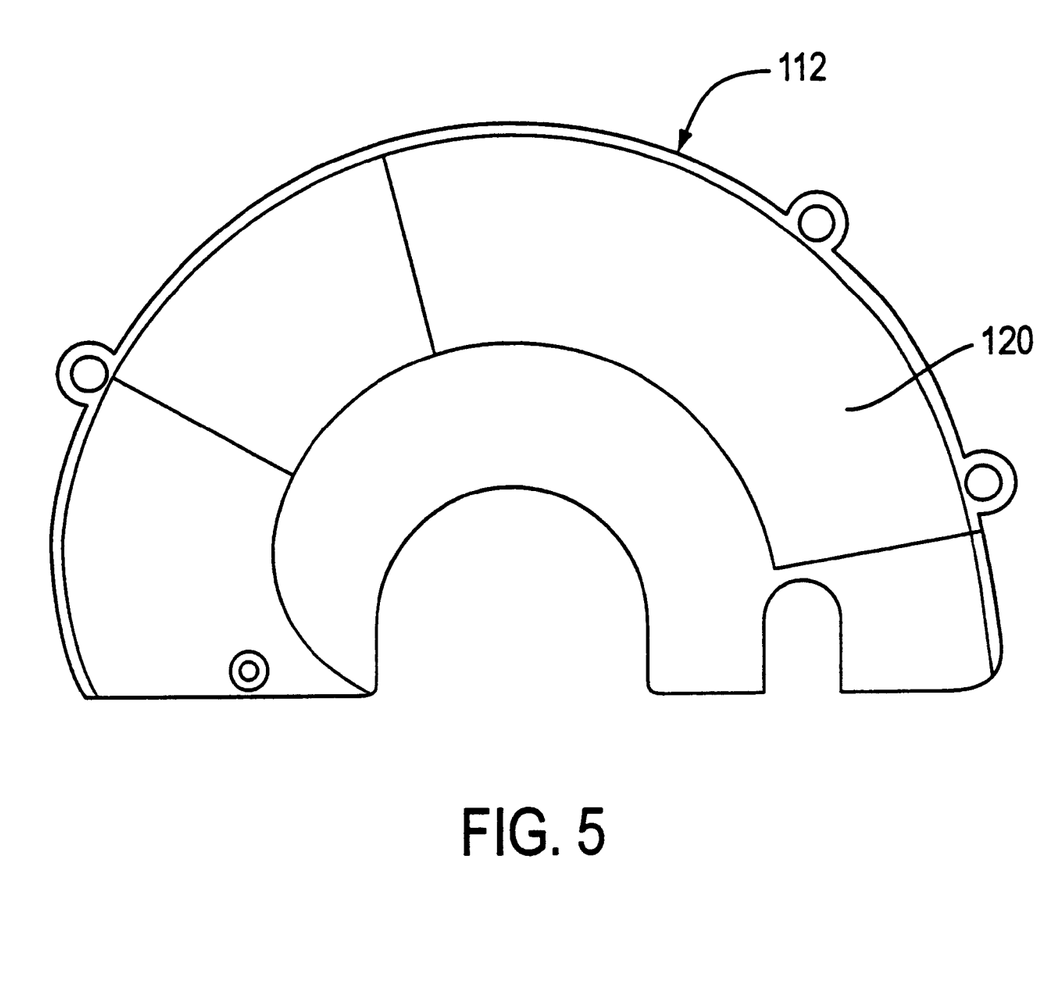
FIG. 5 is a side view showing internal features of an inner section of an upper guard of the circular saw of FIG. 1.
Figure 7:
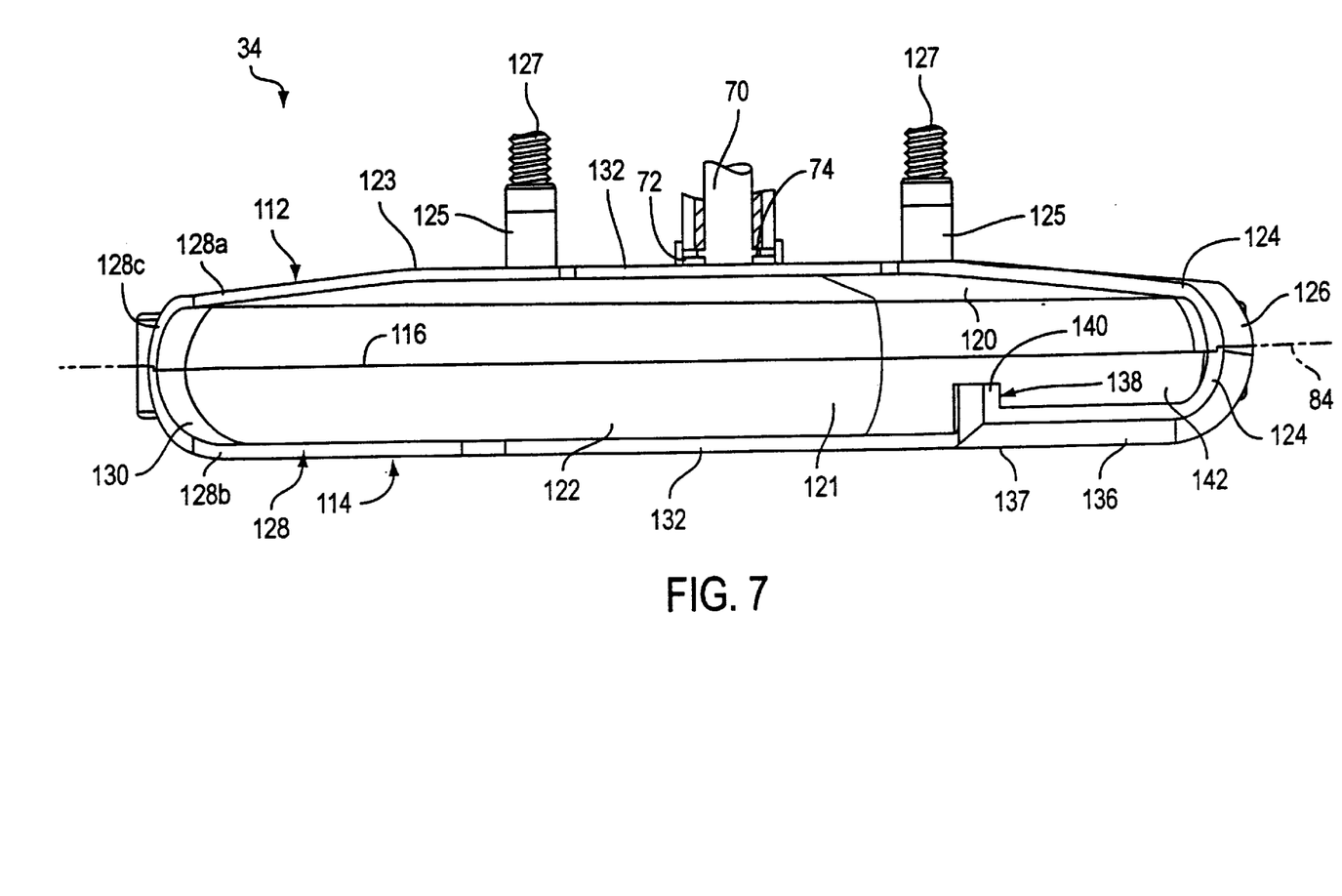
FIG. 7 is a bottom view showing structural features of the assembled inner and outer sections of the upper guard of FIGS. 5 and 6, respectively, embodying certain principles of the invention.

As shown in FIGS. 5 and 7, the inner section 112 of the upper guard 34 is formed generally as a shell with an internal hollow 120. In similar fashion, the outer section 114 is formed generally as a shell with an internal hollow 121, as shown in FIG. 7. When the inner and outer sections 112 and 114 are assembled to form the upper guard 34, the respective hollows 120 and 121 thereof form a substantially enclosed chamber 122 (FIGS. 4 and 7), in which cutting portions of the blade 54 are to be moved during the cutting of the workpiece 57. The enclosure of the chamber 122 is enhanced by close placement of the bottom of the upper guard 34 above the upper surface 46 of the shoe 38.

Figure 6:
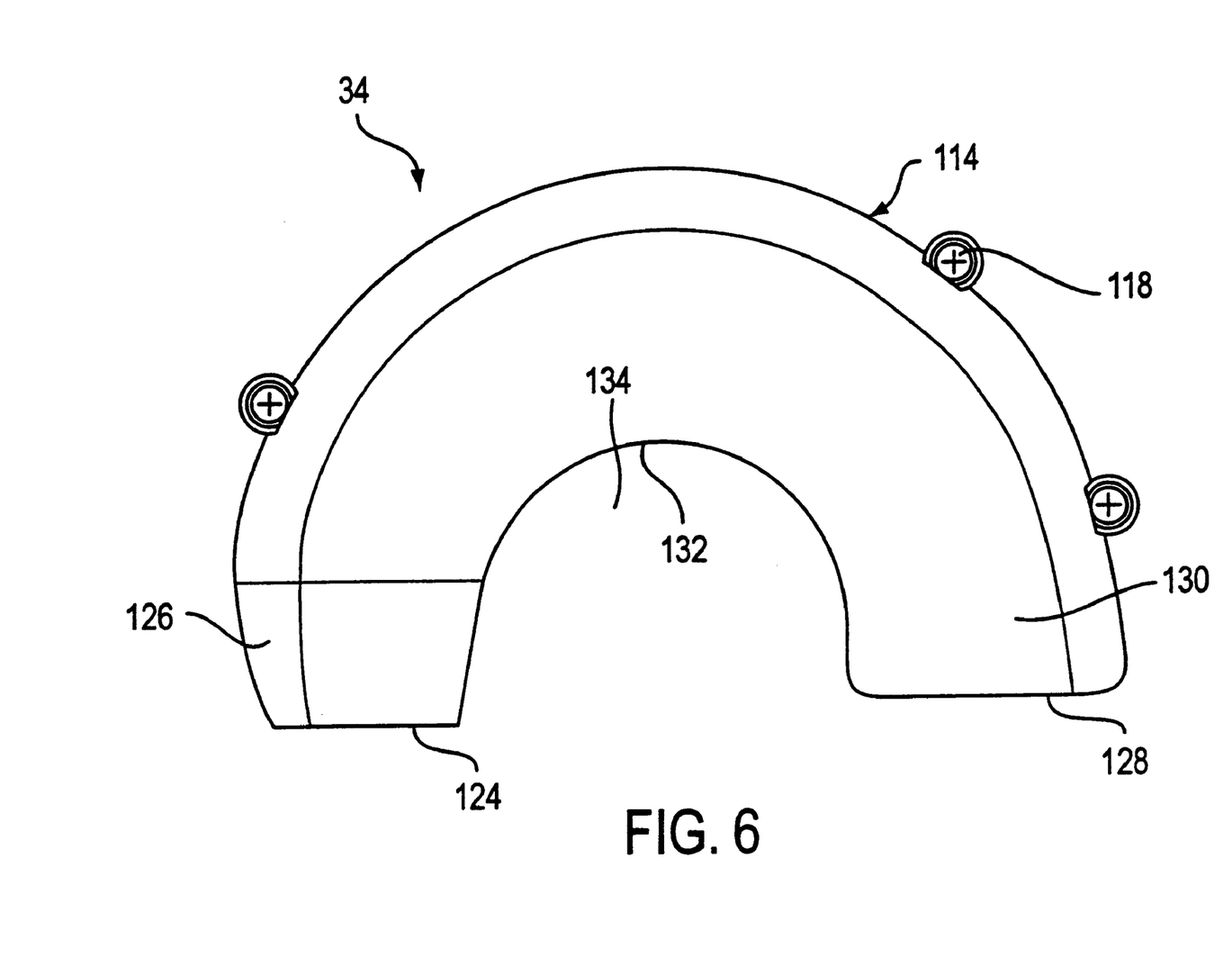
FIG. 6 is a side view showing exterior features of an outer section of the upper guard of the circular saw of FIG. 1 embodying certain principles of the invention.

Referring to FIGS. 5 and 6, each of the inner section 112 and the outer section 114 of the upper guard 34 is formed in a generally C-shaped configuration. As the inner and outer sections 112 and 114, respectively, are assembled to form the upper guard 34, the C-shaped structure of each section is aligned so that the upper guard assumes the C-shaped configuration. Referring to FIGS. 1 and 7, the upper guard 34 is formed with a first end bottom edge 124 at a first or forward end 126 thereof, and a second end bottom edge 128 at a second or rear end 130 thereof spaced from the first end. As viewed in FIG. 7, the second end edge 128 is formed by spaced, straight, bottom edges 128a and 128b of the sections 112 and 114, and curved bottom edges 128c of the sections 112 and 114. As shown in FIG. 1, the second end edge 128 of the upper guard 34 is located above the surface 46 of the shoe 38 to form a space 129 therebetween.

As shown in FIGS. 1 and 6, the upper guard 34 is formed with an arcuate inner edge portion 132 which is contiguous with and extends between the first end edge 124 and the second end edge 128 to define a generally C-shaped opening 134. Referring to FIG. 1, the upper guard 34 is assembled with the housing 32, with the C-shaped opening 134 facing downward toward the upper surface 46 of the shoe 38. In this position, the first end edge 124 of the upper guard 34 is in juxtaposition with the upper surface 46 of the shoe 38 with a slight space 39 therebetween, and is sufficiently close to the shoe to essentially preclude the discharge of chips through the space. As shown in FIGS. 4 and 7, the upper guard 34 is formed with a wing wall 138 along the inner edge portion 132 with the wing wall being located angularly adjacent a side wall 136 of the upper guard. The wing wall 138 extends toward, but does not enter, the plane 84 in which the blade 54 is located when assembled with the saw 30. Further, the wing wall 138 is formed with a bottom edge 140 (FIG. 7), which, in the preferred embodiment, is flush with the first end edge 124 of the upper guard 34. The presence of the wing wall 138 further deters the discharge of chips from the forward cutting area of the saw 30.

The first end edge 124 and the bottom edge 140 of the upper guard 34, together with the wing wall 138 and the adjacent inner walls of the forward end 126 of the upper guard which extend from the first end edge and the bottom edge, define a chamber 142 formed with a prescribed volume. The chamber 142 is located in close proximity with the shoe 38 such that the chamber and the adjacent portion of the shoe provide an enclosure. During a cutting operation, the developed chips are essentially precluded from being discharged outside the portion of the upper guard 34 which includes the chamber 142, except for a minimal number of chips which may be discharged downward through the forward portion 106 of the shoe opening 86 and in a direction away from the operator. In any event, chips are not discharged through the space 39 between the first end edge 124 and the bottom edge 140, on the one side, and the shoe 38 on the other side.

In the preferred embodiment, the wing wall 138 is perpendicular to the plane 84. However, the wing wall 138 could extend at angles greater or less than ninety degrees, toward the plane 84, without departing from the spirit and scope of the invention. Also, in the preferred embodiment, the wing wall 138 is located adjacent the side wall 136, as illustrated in FIG. 4. However, the wing wall 138 could be located along any section of the inner edge portion 132 between the first end edge 124 and the second end edge 128, or could be longer than shown, without departing from the spirit and scope of the invention.

Referring to FIG. 7, an outboard surface 123 of the inner section 112 of the upper guard 34 is formed with a plurality of bosses 125 having threaded bores. The upper guard 34 is attached to the housing 32 by use of a corresponding plurality of screws 127 which are inserted through the extended enclosure 50 (FIG. 2) of the housing.

As viewed in FIGS. 4 and 7, the upper guard 34 is formed with the exterior side wall 136 on the outer section 114 adjacent the forward end 126 thereof. The side wall 136 is contiguous with and extends from the first end edge 124 for a prescribed distance to a crease line 137. The side wall 136 is tapered outward from the first end edge 124 to the crease line 137 and provides enhanced viewing by the operator from above the saw 30 to a location below the side wall which includes the sight window 90 and the stripes 102 and 104.

Also, as shown in FIG. 7, the outer surface of the wing wall 138 is similarly tapered outward from the bottom edge 140 thereof to a top edge 144 (FIG. 4) thereof. The tapered configuration of the side wall 136 and the wing wall 138 place the bottom edge 140 and the adjacent portion of the first end edge 124 closer to the plane 84 to further constrict the chamber 142 for controlled management of the chips resulting from a cutting operation.

In a conventional circular saw, the hollowed opening of the upper guard is of sufficient radial extension to allow the lower guard to be swung into a space between the periphery of the cutting blade and the radially extended portion of the opening when the lower guard engages the workpiece during a cutting operation. As viewed in FIG. 1, a trailing peripheral portion 148 of the upper guard 34, which is located generally to the right of a vertical centerline 146, flares considerably radially outward from the bolt 80 as the trailing portion extends generally from the centerline to the rear end 130 of the upper guard. Thus, a considerable space is formed within the outward radial extensions of the hollowed opening of the trailing portion 148 of the upper guard 34. With this arrangement, the upper guard 34 is formed with a first, or radially inner, path for receipt of the lower guard 36 as described above, and a second, or radially outer, path, which is radially outboard of the first path, to provide an unobstructed path for the chips passing through the chamber 142 (FIG. 7) from the cutting area to the rear end 130 of the upper guard.

The opening 86 of the shoe 38 is formed with a large rear extended portion 135 (FIG. 3), which is adjacent and below the rear end 130 of the upper guard 34, and above the space 129. The location of the rear portion 135 of the shoe opening 86 facilitates the discharge of the chips from the circular saw 30, in a downward direction through the space 129, through the rear portion 135 of the shoe opening and away from the operator.

With the structure described above, the circular saw 30 manages the dispersement of the chips resulting from the cutting of the workpiece 57, and facilitates the discharging of the chips in a downward direction, away from the operator, either through the forward portion 106 or the rear portion 135 of the shoe opening 86.

Figure 8:
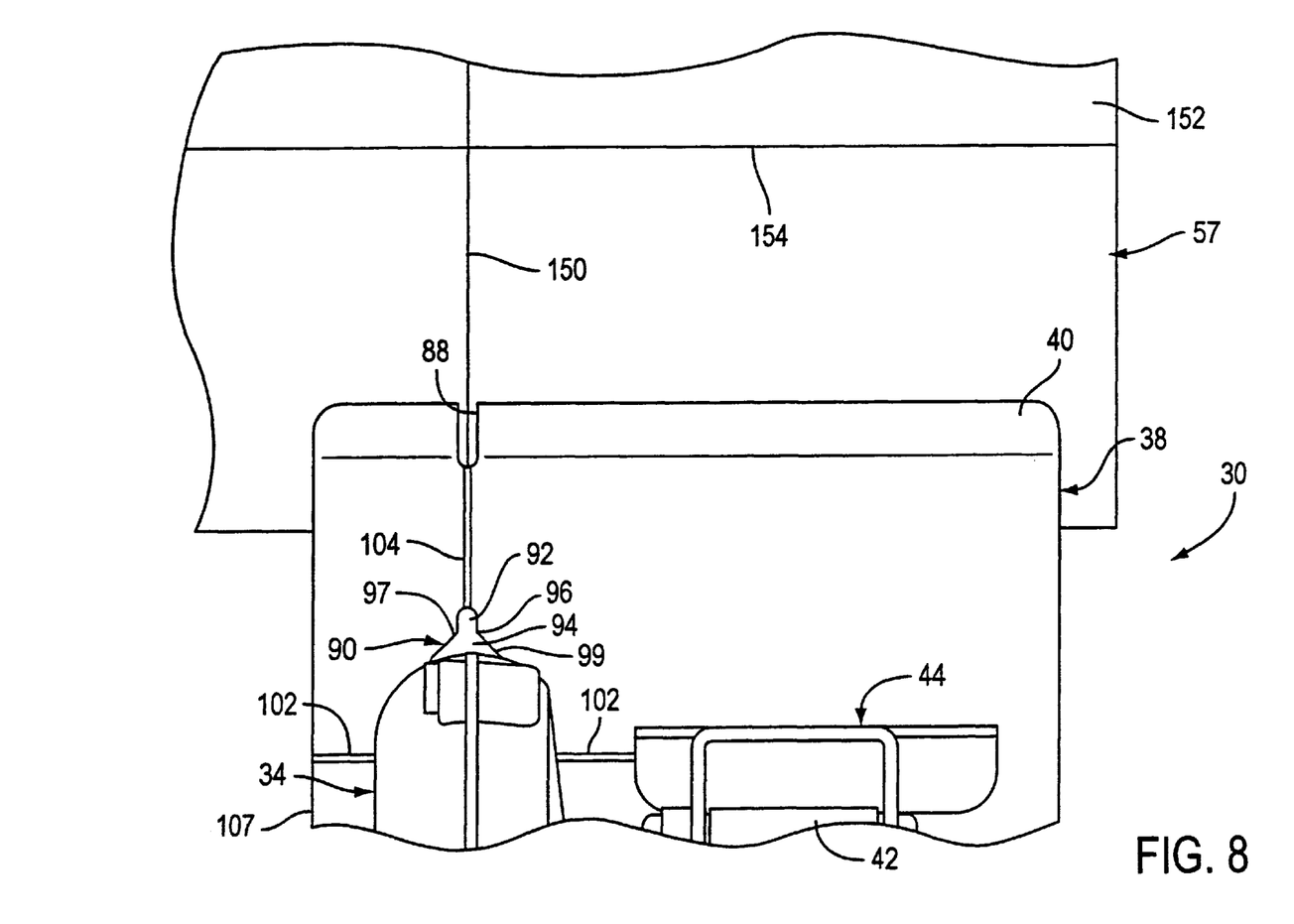
FIG. 8 is a partial top view of the circular saw of FIG. 1 showing the saw in an aligned pre-cut position with a workpiece embodying certain principles of the invention.

Referring to FIG. 8, the operator of the circular saw 30 prepares the workpiece 57 by placing a "kerf " line 150 on a surface 152 thereof which represents the location of the cut or kerf to be formed in the workpiece. The operator then places a "depth" line 154 on the surface 152 of the workpiece 57 which intersects the line 150 at a point representative of the depth of the kerf to be formed in the workpiece. The operator places the forward end of the lower surface 69 of the shoe 38 onto the surface 152 of the workpiece 57 and aligns the kerf line 150, as viewed through the slot 88, with the "cut line " stripe 104. Since the blade 54 and the stripe 104 are in the plane 84, the blade is now aligned with the kerf line 150 of the workpiece.

Figure 9:
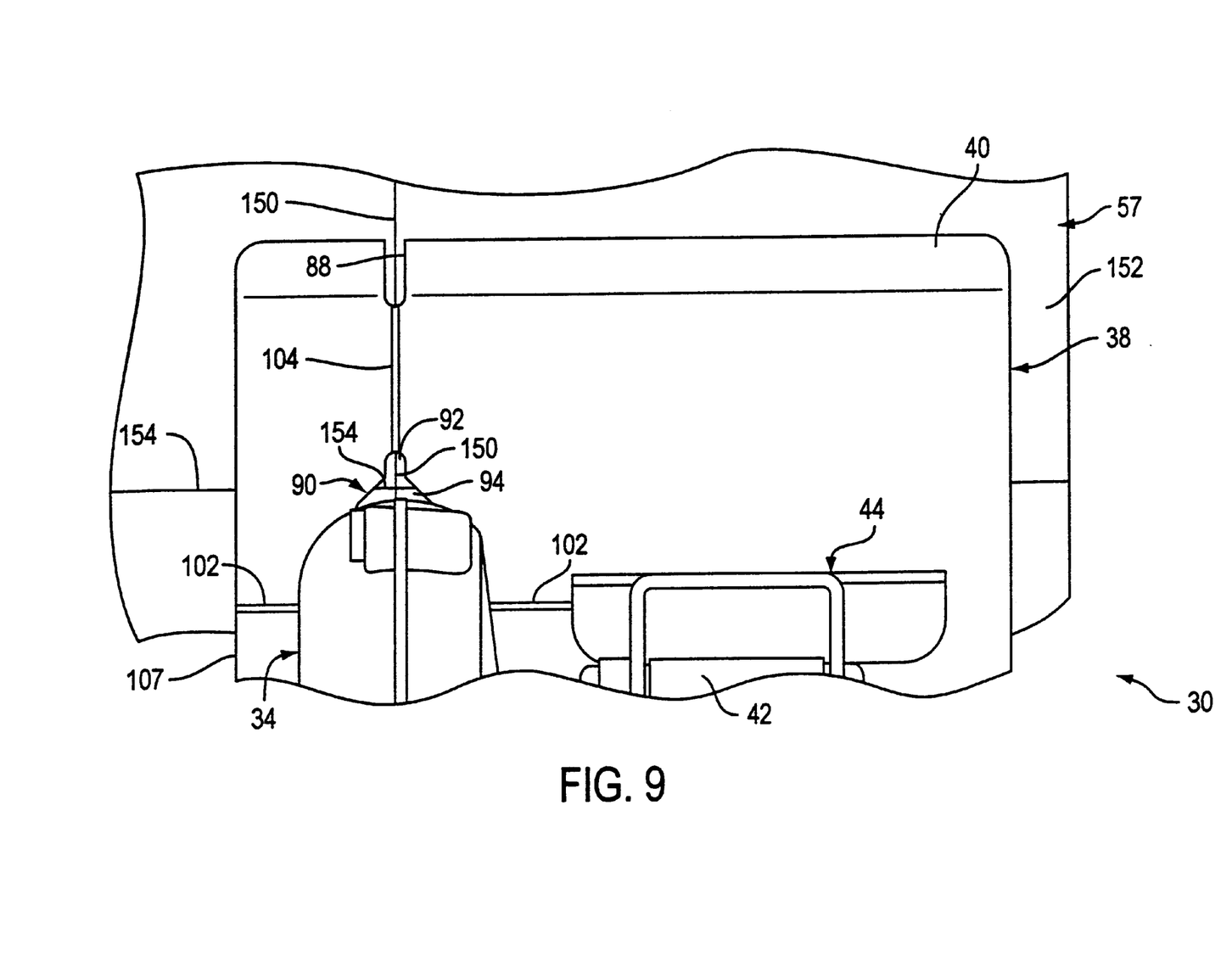
FIG. 9 is a partial top view of the circular saw of FIG. 1 showing the saw in an aligned mid-cut position with the workpiece embodying certain principles of the invention.

The operator closes the trigger switch which facilitates the application of operating energy to the motor 48 whereby the blade 54 is rotatably driven. The operator moves the circular saw 30 forward toward the workpiece 57 and visually maintains the kerf line 150 in alignment with the stripe 104. As shown in FIG. 9, the shoe 38 is moved over the surface 152 of the workpiece 57 and a leading portion of the kerf line 150 eventually appears within the sight window 90 prior to cutting of the workpiece. Spaced portions of the kerf line 150 can now be aligned with the stripe 104 by observing, at a trailing end of the stripe, a trailing portion of the kerf line through the slot 88 and on the exposed portion of the workpiece surface 152, and, at a leading end of the stripe, a leading portion of the kerf line which is visible through the sight window 90. In this manner, spaced leading and trailing portions of the kerf line 150 are readily maintained in alignment with the stripe 104 for accurate formation of the kerf.

Eventually, the teeth 55 of the blade 54 begin to form the kerf in the workpiece 57 while spaced portions of the kerf line 150, comparable to the leading and trailing portions noted above, continue to be observed at opposite ends of the stripe 104 for continued accurate formation of the kerf. Also, as the shoe 38 is moved rearward over the surface 152 of the workpiece 57, the depth line 154 on the surface 152 appears in the sight window 90 to alert the operator that the desired depth of cut is being approached.

Figure 10:
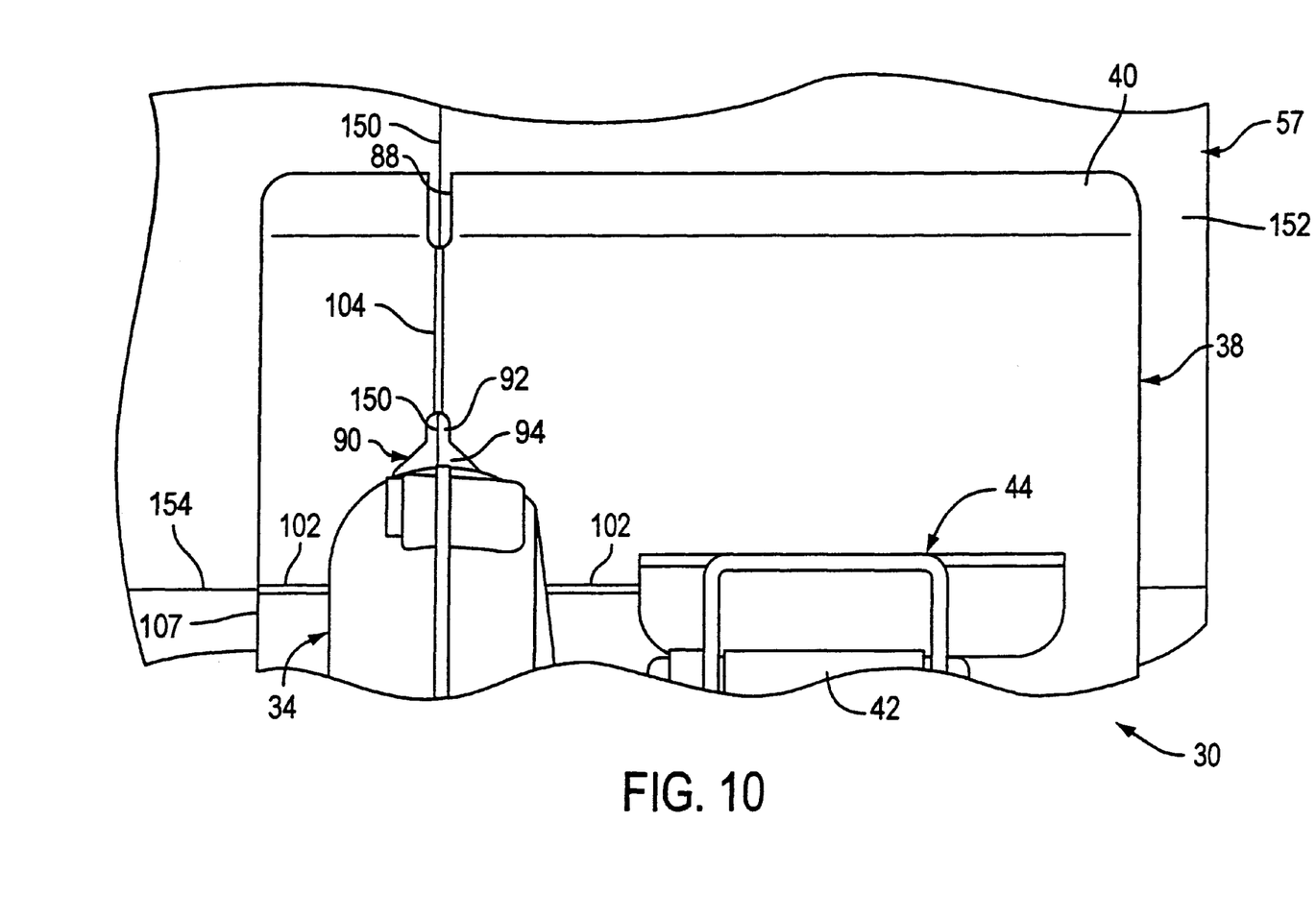
FIG. 10 is a partial top view of the circular saw of FIG. 1 showing the saw in an aligned completed-cut position with the workpiece embodying certain principles of the invention.

Referring to FIG. 10, as the circular saw 30 continues to be moved forward, the spaced leading and trailing portions of the kerf line 150 continue to be observed at opposite ends of the stripe 104 for continued accurate formation of the kerf. The operator continues to move the circular saw 30 forward until the operator observes that the depth line 154 on the workpiece surface 152 is aligned with the stripe 102 which indicates that the desired depth cut has been attained. The operator withdraws the circular saw from the workpiece 57 while releasing the trigger to remove rating energy from the motor 48.

In general, the above-identified embodiments are not to be construed as limiting the breadth of the present invention. Modifications, and other alternative constructions, will be apparent which are within the spirit and scope of the invention as defined in the appended claims.

What is claimed is:

1. A circular saw, which comprises:
   a housing;
   a mount for receiving and supporting a saw blade in a given plane;
   a motor located within the housing and coupled to the mount for driving the mount and, thereby, the saw blade to be mounted thereon;
   a shoe attached to the housing and having a forward end;
      the shoe formed with a first opening therethrough for receipt of the saw blade and located along a centerline which is located in the given plane;
      the shoe formed with a second opening therethrough and located between the forward end and the first opening of the shoe;
         the second opening formed with a first section of a first prescribed width about the centerline and with a second section of a second prescribed width about the centerline;
            the second prescribed width being greater than the first prescribed width;
         the second section of the opening formed along the centerline with a first end and a second end spaced from the first end; and
         the width of the second section of the opening varies from the first end to the second end thereof along the centerline.

2. The circular saw as set forth in claim 1, wherein the width of the second section varies linearly from the first end to the second end thereof.

3. A circular saw
   a housing;
   a mount for receiving and supporting a saw blade in a given plane;
   a motor located within the housing and coupled to the mount for driving the mount and thereby, the saw blade to be mounted thereon;
   a shoe attached to the housing and formed with an opening therethrough located along a centerline which is located in the given plane;
   the opening formed with a first section of a first prescribed width about the centerline and with a second section of a second prescribed width about the centerline; and
      the second prescribed width being greater than the first prescribed width;
      the second section of the opening formed along the centerline with a first end and a second end spaced from the first end;
      the width of the second section of the opening varies from the first end to the second end thereof along the centerline; and wherein the width of the second section has a variance which includes a curved portion.

4. A circular saw which comprises:
   a housing;
   a mount for receiving and supporting a saw blade in a given plane;
   a motor located within the housing and coupled to the mount for driving the mount and, thereby, the saw blade to be mounted thereon;
   a shoe attached to the housing and formed with an opening therethrough located along a centerline which is located in the given plane;
   the opening formed with a first section of a first prescribed width about the centerline and with a second section of a second prescribed width about the centerline;
   the second prescribed width being greater than the first prescribed width; and
   a stripe located on the shoe extending at an angle with respect to the plane and which is aligned with and spaced from a forwardmost cutting location of the blade.

5. The circular saw as set forth in claim 4, wherein the structural configuration of the stripe is selected from the group consisting of a groove, a ridge and a mark.

6. The circular saw as set forth in claim 4, wherein the stripe is perpendicular to the plane.

7. The circular saw as set forth in claim 4, wherein the stripe is a first stripe, and which further comprises:
   a second stripe located on the shoe adjacent and extending at an angle with respect to the plane and which is located in a plane which intersects a plane of the centerline.

8. A circular saw which comprises:
   a housing;
   a mount for receiving and supporting a saw blade in a given plane;
   a motor located within the housing and coupled to the mount for driving the mount and, thereby, the saw blade to be mounted thereon;
   a shoe attached to the housing and formed with an opening therethrough located along a centerline which is located in the given plane;
   the opening formed with a first section of a first prescribed width about the centerline and with a second section of a second prescribed width about the centerline;
   the second prescribed width being greater than the first prescribed width;
   a guard attached to the housing and extending outward from one side of the shoe;
   the guard forming a substantially enclosed chamber about an area in which cutting portions of the blade are to be moved during cutting of a workpiece;
   the guard being formed with a first end edge at one end thereof in a forward area of the saw where the blade is to cut into the workpiece, and a second end edge at a second end of the guard spaced from the first end edge in a rear area of the saw;
   the first end edge of the guard being located in juxtaposition with the one side of the shoe to essentially preclude the discharge of chips through any space between the first end edge and the shoe in the forward area; and
   the second end edge of the guard being adjacent the one side of the shoe to define an opening therebetween which is limited in size to allow chips to be discharged therethrough but control the direction of movement of the discharged chips away from the saw.

9. The circular saw as set forth in claim 8, which further comprises:

the guard formed with an inner edge portion which extends between the first end edge and the second end edge; and a wing wall extending from the inner edge portion of the guard toward the plane of location of the blade.

10. A circular saw, which comprises:

a housing;

a mount for receiving and supporting a saw blade in a given plane;

a motor located within the housing and coupled to the mount for driving the mount and, thereby, the saw blade to be mounted thereon;

a shoe attached to the housing and formed with an opening therethrough located along a centerline which is located in the given plane;

the opening formed with a first section of a first prescribed width about the centerline and with a second section of a second prescribed width about the centerline;

the second prescribed width being greater than the first prescribed width;

a guard attached to the housing and extending outward from one side of the shoe;

the guard forming a substantially enclosed chamber about an area in which cutting portions of the blade are to be moved during cutting of a workpiece;

the guard being formed with a first end edge at one end thereof in a forward area of the saw where the blade is to cut into the workpiece, and a second end edge at a second end of the guard spaced from the first end edge in a rear area of the saw;

the first end edge of the guard being located in juxtaposition with the one side of the shoe to essentially preclude the discharge of chips through any space between the first end edge and the shoe in the forward area; and the second end edge of the guard being adjacent the one side of the shoe to define an opening therebetween which is limited in size to allow chips to be discharged therethrough but control the direction of movement of the discharged chips away from the saw;

the guard formed with a side wall in the forward area which extends from the first end edge toward the second end edge for a prescribed distance; and the side wall being tapered outward from the first end edge for the prescribed distance.

11. The circular saw as set forth in claim 10, which further comprises:

the guard formed with an inner edge portion which extends from the first end edge toward the second end edge for a prescribed distance; and a wing wall extending from the inner edge portion of the guard toward the given plane of the location of the blade.

12. A circular saw, which comprises:

a housing;

a mount for receiving and supporting a saw blade in a given plane;

a motor located within the housing and coupled to the mount for driving the mount and, thereby, the saw blade to be mounted thereon;

a shoe attached to the housing and formed with an opening therethrough located along a centerline which is located in the given plane;

the opening formed with a first section of a first prescribed width about the centerline and with a second section of a second prescribed width about the centerline;

the second prescribed width being greater than the first prescribed width;

a stripe located on the shoe extending at an angle with respect to the plane and which is aligned with and spaced from a forwardmost cutting location of the blade;

a guard attached to the housing and extending outward from one side of the shoe;

the guard forming a substantially enclosed chamber about an area in which cutting portions of the blade are to be moved during cutting of a workpiece;

the guard being formed with a first end edge at one end thereof in a forward area of the saw where the blade is to cut into the workpiece, and a second end edge at a second end of the guard spaced from the first end edge in a rear area of the saw;

the first end edge of the guard being located in juxtaposition with the one side of the shoe to essentially preclude the discharge of chips through any space between the first end edge and the shoe in the forward area; and the second end edge of the guard being adjacent the one side of the shoe to define an opening therebetween which is limited in size to allow chips to be discharged therethrough but control the direction of movement of the discharged chips away from the saw.

13. A circular saw, which comprises:

a housing;

a mount for receiving and supporting a saw blade in a given plane;

a motor located within the housing and coupled to the mount for driving the mount and, thereby, the saw blade to be mounted thereon;

a shoe attached to the housing;

a stripe located on one side of the shoe facing, and aligned with, a forwardmost cutting location of the blade; and the stripe being perpendicular to the given plane of the blade.

14. A circular saw, which comprises:

a housing;

a mount for receiving and supporting a saw blade in a given plane;

a motor located within the housing and coupled to the mount for driving the mount and, thereby, the saw blade to be mounted thereon;

a shoe attached to the housing;

a stripe located on one side of the shoe facing, and aligned with, a forwardmost cutting location of the blade;

the stripe extending at an angle with respect to the given plane of the blade.

a guard attached to the housing and extending outward from one side of the shoe;

the guard forming a substantially enclosed chamber about an area in which cutting portions of the blade are to be moved during cutting of a workpiece;

the guard being formed with a first end edge at one end thereof in a forward area of the saw where the blade is to cut into the workpiece, and a second end edge at a second end of the guard spaced from the first end edge in a rear area of the saw;

the first end edge of the guard being located in juxtaposition with the one side of the shoe to essentially preclude the discharge of chips through any space between the first end edge and the shoe in the forward area; and the second end edge of the guard being adjacent the one side of the shoe to define an opening therebetween which is limited in size to allow chips to be discharged therethrough but control the direction of movement of the discharged chips away from the saw.

15. The circular saw as set forth in claim 14, which further comprises:

the guard formed with a side wall in the forward area which extends from the first end edge toward the second end edge for a prescribed distance; and the side wall being tapered outward from the first end edge for the prescribed distance.

16. The circular saw as set forth in claim 14, which further comprises:

the guard formed with an inner edge portion which extends between the first end edge and the second end edge; and a wing wall extending from the inner edge portion of the guard toward the plane of location of the blade.

17. The circular saw as set forth in claim 15, which further comprises:

the guard formed with an inner edge portion which extends from the first end edge toward the second end edge for a prescribed distance; and a wing wall extending from the inner edge portion of the guard toward the given plane of the location of the blade.

18. A circular saw, which comprises:

a housing;

a mount for receiving and supporting a saw blade in a given plane;

a motor located within the housing and coupled to the mount for driving the mount and, thereby, the saw blade to be mounted thereon;

a shoe attached to the housing;

a guard attached to the housing and extending outward from one side of the shoe;

the guard forming a substantially enclosed chamber about an area in which cutting portions of the blade are to be moved during cutting of a workpiece;

the guard being formed with a first end edge at one end thereof in a forward area of the saw where the blade is to cut into the workpiece, and a second end edge at a second end of the guard spaced from the first end edge in a rear area of the saw;

the first end edge of the guard being located in juxtaposition with the one side of the shoe and sufficiently close to the shoe to essentially preclude the discharge of chips through any space between the first end edge and the shoe in the forward area;

the second end edge of the guard being adjacent the one side of the shoe to define an opening therebetween which is sufficiently limited in size to allow chips to be discharged therethrough but control the direction of movement of the discharged chips away from the saw;

the guard formed with a side wall in the forward area which extends from the first end edge toward the second end edge for a prescribed distance; and the side wall being tapered outward from the first end edge for the prescribed distance.

19. The circular saw as set forth in claim 18, which further comprises:

the guard formed with an inner edge portion which extends from the first end edge toward the second end edge for a prescribed distance; and a wing wall extending from the inner edge portion of the guard toward the given plane of the location of the blade.

20. A circular saw, which comprises:

a housing;

a mount for receiving and supporting a saw blade in a given plane;

a motor located within the housing and coupled to the mount for driving the mount and, thereby, the saw blade to be mounted thereon;

a guard formed with a first end edge and a second end edge spaced therefrom;

the guard formed with an inner edge portion which extends between the first end edge and the second end edge;

a wing wall extending from the inner edge portion of the guard toward the given plane;

the guard formed with a side wall in the forward area which extends from the first end edge toward the second end edge for a prescribed distance; and the side wall being tapered outward from the first end edge for the prescribed distance.

21. The circular saw as set forth in claim 12, which further comprises:

the guard formed with an inner edge portion which extends between the first end edge and the second end edge; and a wing wall extending from the inner edge portion of the guard toward the plane of location of the blade.

* * * * *